United States Patent [19]
McLachlan et al.

[11] Patent Number: 6,144,458
[45] Date of Patent: Nov. 7, 2000

[54] SINGLE-PASS TRANSMISSION OF REPEATED OBJECTS BETWEEN HOST AND PRINTER

[75] Inventors: Alan McLachlan, Walnut Creek; Peter Mierau, Alamo, both of Calif.

[73] Assignee: Adobe Systems Incorporated, San Jose, Calif.

[21] Appl. No.: 09/146,058

[22] Filed: Sep. 2, 1998

[51] Int. Cl.[7] .................................................. G06F 15/00
[52] U.S. Cl. ...................... 358/1.15; 358/1.11; 358/1.13; 358/1.16; 382/218; 382/219
[58] Field of Search .................................. 358/1.11, 1.12, 358/1.13, 1.14, 1.15, 1.16, 1.17, 448, 452, 453; 382/181, 190, 203, 209, 218, 219

[56] References Cited

U.S. PATENT DOCUMENTS

| | | | |
|---|---|---|---|
| 5,694,485 | 12/1997 | Shoji | 358/1.11 |
| 5,699,266 | 12/1997 | Chung et al. | 364/491 |
| 5,732,197 | 3/1998 | Nakagiri | 358/1.11 |
| 5,748,860 | 5/1998 | Shively | 358/1.15 |
| 5,995,718 | 11/1999 | Hiraike | 358/1.11 |

OTHER PUBLICATIONS

Zachary Vonler and Brian Pane, "dxpc—a Differential X Protocol Compressor", Version 3.7.0, Sep. 7, 1997.
Steve Roth, "Faster Printing Through Font Downloading", Macworld, vol. 13, No. 7, p. 128, Jul. 1996.
Bob Schaffe and Chuck Weger, "Font Fatigue", MacUser, vol. 12, No. 1, p. 111(1), Jan. 1996.

*Primary Examiner*—Edward L. Coles
*Assistant Examiner*—Mark Wallerson
*Attorney, Agent, or Firm*—Fish & Richardson, P.C.

[57] ABSTRACT

Apparatus and methods for transmitting graphical objects from a computer system to a printer. A graphical object is received from an application program. Graphical objects are stored in a computer memory coupled to the computer system. If the received graphical object matches a graphical object stored in the computer memory, an identifier identifying the matching graphical object, rather than the graphical object itself, is transmitted to the printer. Otherwise the received graphical object is stored in the computer memory and transmitted to the printer.

35 Claims, 7 Drawing Sheets

FIG. 6

FIG. 7

SINGLE-PASS TRANSMISSION OF REPEATED OBJECTS BETWEEN HOST AND PRINTER

BACKGROUND OF THE INVENTION

The invention relates to the transmission of repeated graphical objects to a printer.

Electronic documents often contain multiple copies of the same graphical objects. A common example is fonts. Conventional operating systems, such as Microsoft® Windows95, and printer drivers typically have a defined process for optimizing transmission of characters. However, electronic documents also often contain multiple copies of other raster or vector objects. Conventional printer drivers typically do not perform optimization of transmissions for these graphical objects.

To cause a printer to draw a graphical object repeatedly, an application program typically makes repeated "drawing") calls to the operating system. Each repeated drawing call may include different coordinates or other attributes. The operating system transmits each call to a printer driver which in turns transmits a request to a printer to render the graphical object on media such as paper. Accordingly, the printer driver repeatedly transmits the same graphical object to the printer.

Conventional printers typically store graphical objects as they are received. When the printer driver repeatedly transmits the same graphical object to such a printer, the printer typically stores multiple copies of the same graphical object. In order to be able to store these copies, the printer requires a large memory.

In addition, each transmission to a printer typically requires time proportional to the amount of data transmitted. When the printer driver repeatedly transmits a large graphical object to the printer, a large amount of time may be consumed.

SUMMARY

The invention provides apparatus and methods implementing a technique for transmitting graphical objects to a printer. In general, in one aspect, the technique includes receiving a first graphical object from an application program; storing the first graphical object in a computer memory coupled to the computer system, where the computer memory is not shared with the printer; receiving a second graphical object from the application program; comparing the second graphical object to the first graphical object; transmitting the first graphical object to the printer; and transmitting to the printer an identifier identifying the first graphical object to the printer if the second graphical object matches the first graphical object, and otherwise storing the second graphical object in the computer memory and transmitting the second graphical object to the printer.

Advantages that may be seen in implementations of the invention include one or more of the following. An avoidable use of memory on a printer is eliminated. A document containing repeated occurrences of the same object can be transmitted to a printer quickly. The details of one or more embodiments of the invention are set forth in the accompanying drawings and the description below. Other features and advantages of the invention will be apparent from the description and drawings, and from the claims.

BRIEF DESCRIPTION OF THE DRAWINGS

FIG. 1 is a block diagram of a computer system including a printer driver according to the invention and a printer.

FIG. 2 is a flow chart of the operation of the printer driver.

FIG. 3 is a flow chart of comparing objects.

FIG. 4 is a flow chart of a comparison process for raster objects.

FIG. 5 is a flow chart of a comparison process for vector objects.

FIG. 6 is a flow chart of a linear process of an alternative printer driver.

FIG. 7 shows a computer system connected to a printer.

DETAILED DESCRIPTION

The invention provides methods and apparatus for transmitting repeated occurrences of graphical objects to a printing device without sending the entire graphical object with each repeated occurrence. As shown in FIG. 1, programs running on a computer system 100 send pages to be printed on a printer 120. The computer system includes a computer running an illustrative application program 105, an operating system 110, and a printer driver 115. The computer 102 can have various kinds of memory devices that can be used for storing data by programs, including application programs and printer drivers, that run on the computer. Such memory devices can include random access memory (RAM), locally-connected magnetic disk drives, and magnetic disk drives on a server connected to the computer by a high-speed link, such as a 10Base-T or 100Base-T Ethernet connection. Such memory devices or memory subsystems usable as local storage by programs running on the computer 102 will be referred to generically as computer memory 117.

In operation, the application program 105 generates graphical objects for a printer 120. To print a graphical object, the application program 105 passes output including the graphical object to the operating system 110 with a request to print the object. The operating system 110 receives the print request and in turn passes the graphical object to the printer driver 115. The printer driver 115 is a general-purpose driver that is external to the application program 105 and independent of it. In other words, the printer driver is not internal to the application program, nor is it an application-specific driver that is designed to work with and support a particular application program, such as a subroutine in a library associated with the application program 105.

The printer driver 115 compares the received graphical object to any graphical objects stored in the computer memory 117, as described below. The printer driver 115 sends a print request to the printer 120 along with the graphical object or an identifier identifying the graphical object.

As shown in FIG. 2, in a process 200 of transmitting graphical objects to a printer, the printer driver receives a graphical object from an application program (step 205). The graphical object is defined according to a type, such as a raster object (e.g., a bitmap), a vector object, or a clipping object defining a clipping path. The printer driver can receive the graphical object from an application program directly or through an operating system, as shown in FIG. 1. The printer driver compares the received graphical object to each graphical object stored in the computer memory by the printer driver (step 210).

A graphical object has one or more elements. One element defines the type of the object. Different types of objects can have different elements. Elements of a raster object can include a data size, a color depth, and one or more pixels of a depth of one or more bits. Elements of a vector object can include a data size and one or more points defining a shape of the object. Additional examples of elements include location, color, and scale. The bits of objects can be used as elements for bitwise comparisons. The printer driver accesses a table indicating which elements are required for comparison for each type of object. In defining a table, it is advantageous to select those elements that are large enough that a savings is achieved by avoiding retransmission. When the printer driver compares two objects, the printer driver compares the required elements to determine whether the objects match. The remaining elements of the object are overriding elements. The printer driver does not compare the overriding elements to determine whether the objects match. Overriding elements of an object are sent with an identifier to the printer when the object matches another object previously stored in memory. A comparison process for matching objects is described later in reference to FIG. 3.

Figure 2:
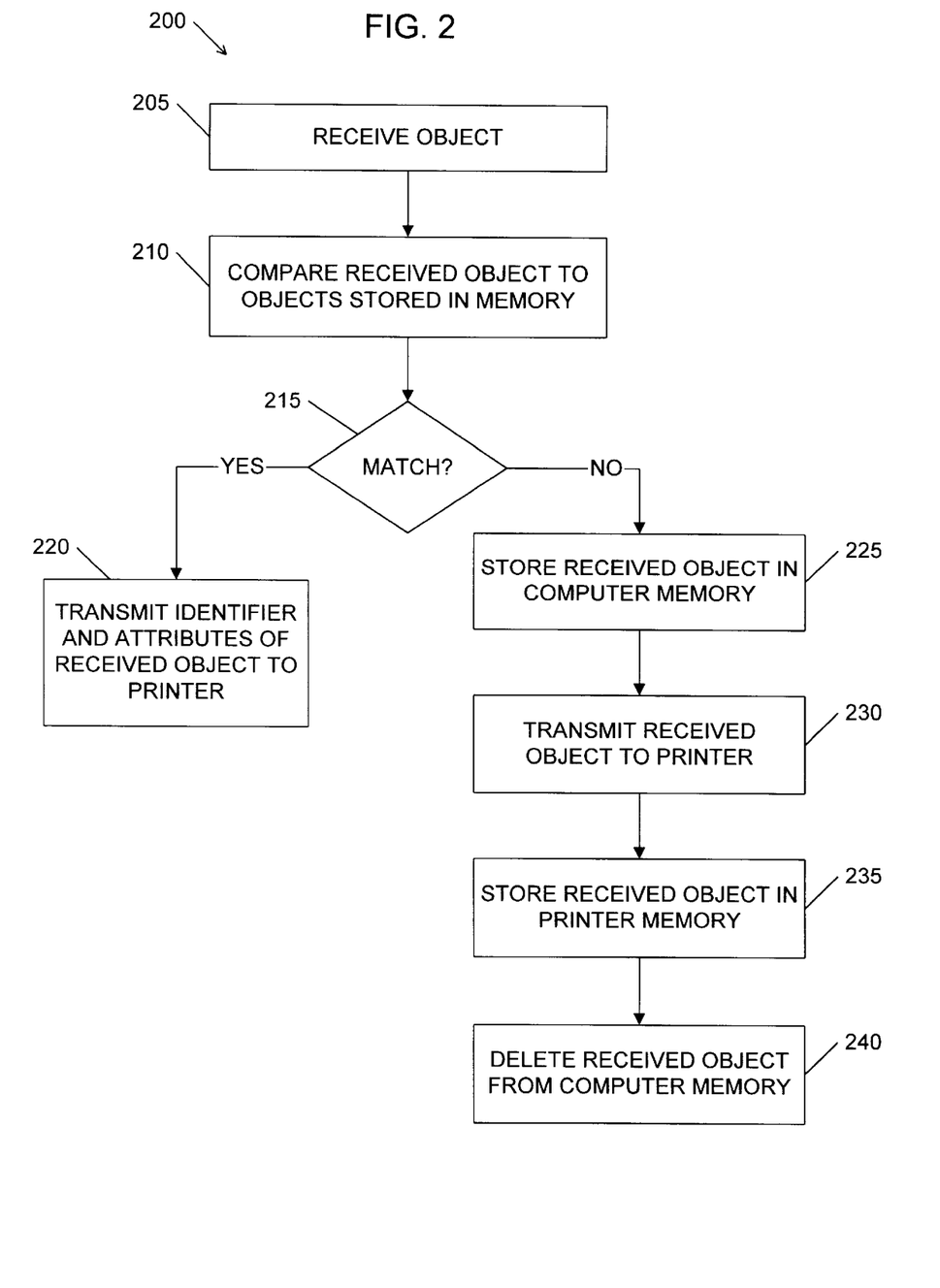

If the received graphical object matches a graphical object stored in the computer memory, the printer driver assigns an identifier to the received graphical object and transmits the identifier to the printer (step 220). The printer driver transmits the overriding elements of the received graphical object along with the identifier. Alternatively, the printer driver compares the overriding elements of the received graphical object and those of the matching stored graphical object and transmits only the elements of the received graphical object which differ from those of the matching stored graphical object. The transmitted elements override corresponding elements of the identified graphical object stored in the printer memory.

To take a simple example, a graphical object stored in memory may be a circle located at a first position and a received graphical object may be a circle located at a second position. The printer driver recognizes that the received graphical object and the stored graphical object match, i.e., their required elements are the same, but the elements indicating locations of the objects are different. The printer driver transmits an identifier for the stored graphical object, i.e., the circle at the first location, along with the overriding element indicating the location of the received graphical object. In response, the printer prints a circle at the second location.

The identifiers sent by the printer driver can be generated by the printer driver. Alternatively, identifiers can be generated elsewhere within the computer system and passed to the printer driver and then on to the printer. In yet another alternative, identifiers can be generated by the printer and transmitted back to the printer driver.

If the received graphical object does not match any graphical object stored by the printer driver, the printer driver stores the received graphical object in the computer memory (step 225). The printer driver transmits the received graphical object to the printer, including all the object's elements (step 230). Along with the graphical object, the printer driver transmits instructions to cause the printer to store the received graphical object in a memory of the printer (step 235).

The printer driver maintains a model of the printer memory and operation of the printer to predict how the printer memory will be used. The printer driver updates the model to keep track of the available memory in the printer. As graphical objects are stored in the computer memory and caused to be stored in the memory of the printer, the printer driver monitors the remaining memory in the printer memory. When the printer memory does not have enough remaining space to store the received graphical object (or store another graphical object), the printer deletes objects from the printer memory. When the model indicates that the printer memory is full and the printer will delete one or more graphical objects from the printer memory, the printer driver deletes the corresponding objects from the computer memory of the computer system (step 240). Alternatively, the printer driver sends an instruction to the printer to cause the printer to delete one or more graphical objects from the printer memory and deletes the corresponding graphical objects from the computer memory. In another alternative, the printer stores and deletes objects on a page basis, and the model indicates the end of a page and the ensuing deletions of objects from the printer memory. In response to an indication of deletions from the printer memory, the printer driver deletes corresponding graphical objects from the computer memory.

Figure 3:
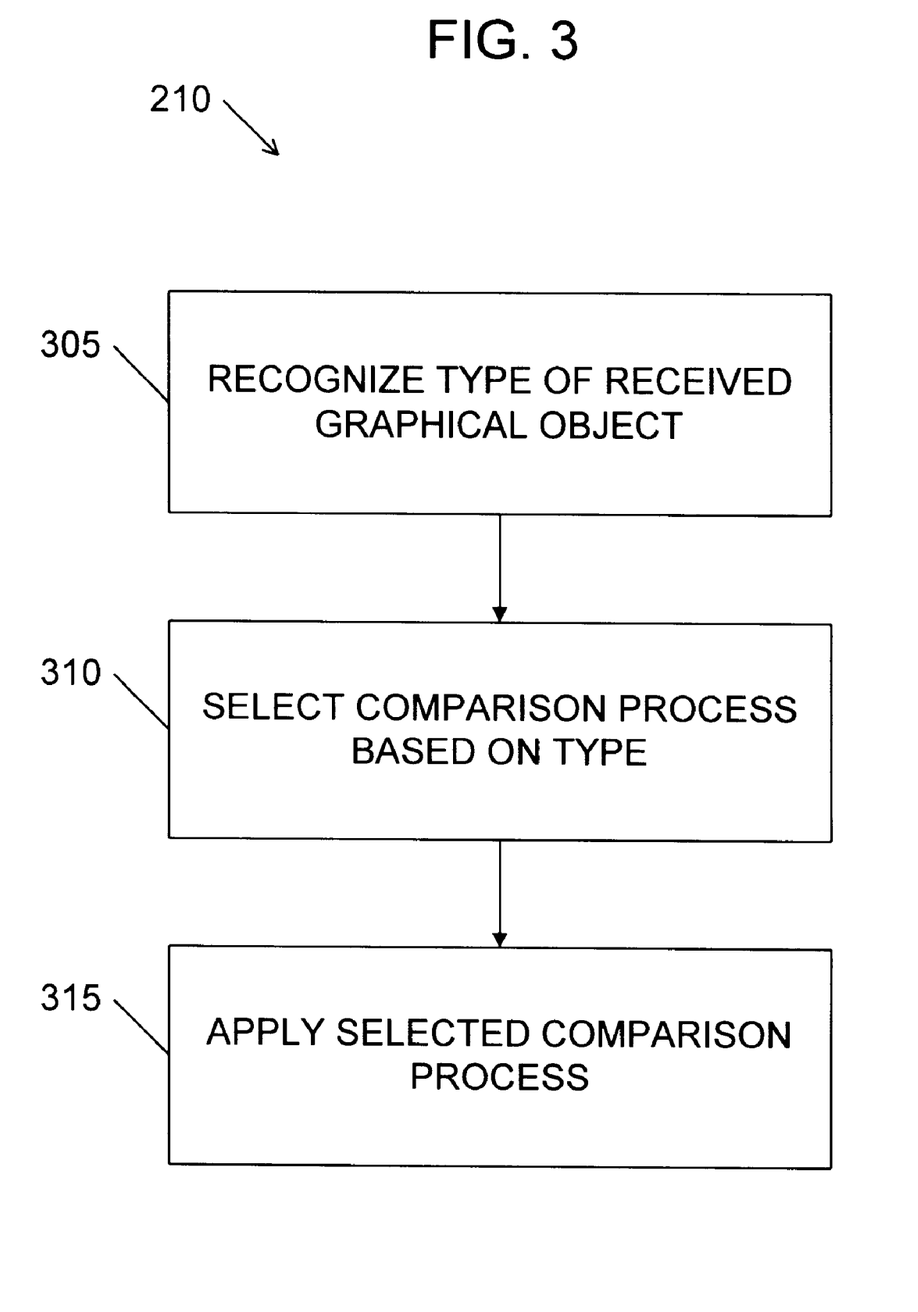

As shown in FIG. 3, in a comparison process 210, the printer driver recognizes the type of the received graphical object (step 305). The printer driver selects a comparison process corresponding to the type of the received graphical object (step 310). As described above, the printer driver accesses a table indicating the required elements for a comparison process corresponding to the type of the received graphical object. The printer driver then repeatedly applies the selected comparison process to determine whether the received graphical object matches any of the stored graphical objects (step 315).

Figure 4:
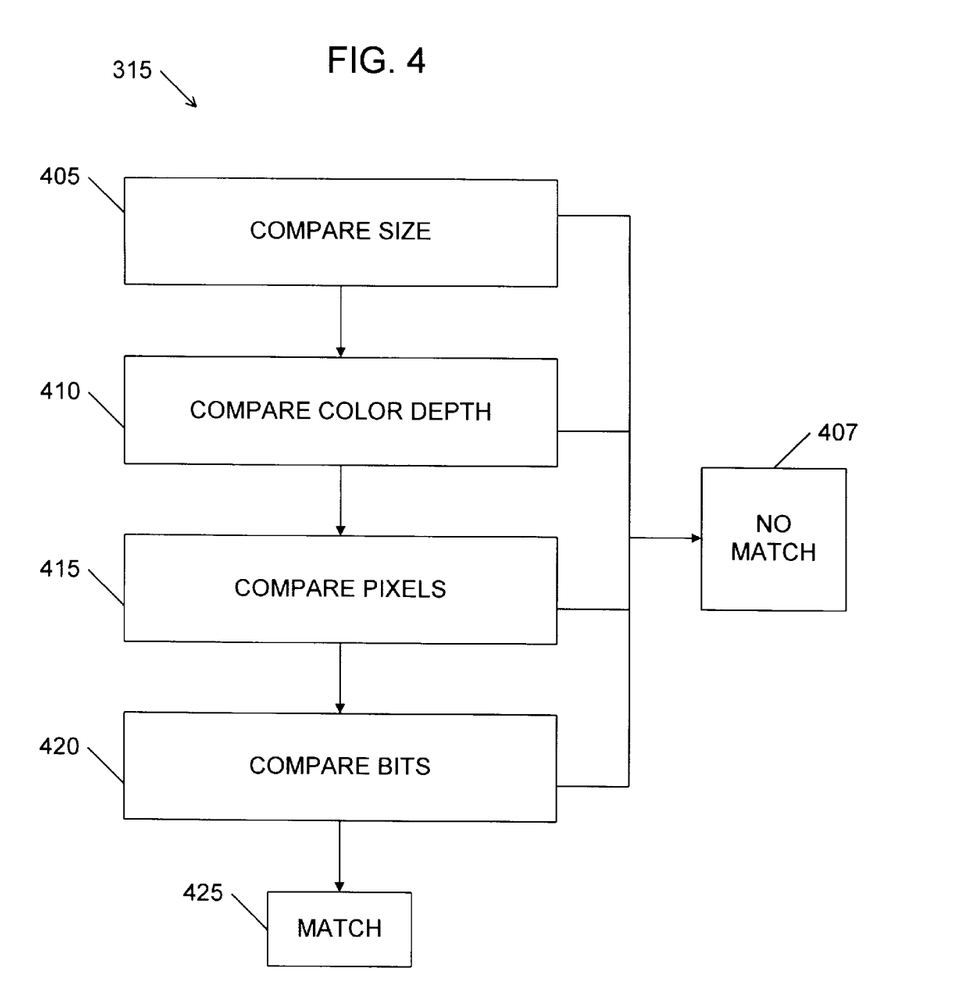

As shown in FIG. 4, in the application of a comparison process 315 where the received graphical object is a raster object, the printer driver first compares type elements of the received graphical object and of an object stored in the computer memory (step 402). If the type elements are not the same, the objects are not the same type and do not match (step 404). As described above, the printer driver compares the required elements of the objects. The overriding elements of the objects are not compared to determine if the objects match. Thus, the printer driver compares each of the required elements for raster objects. The printer driver compares the data size element of the received graphical object to the data size element of the stored object (step 405). If they are not the same, the printer driver recognizes that the objects do not match (step 404). If they are the same, the printer driver compares the color depth element of the received graphical object with that of the stored graphical object (step 410). If the color depths are the same, the printer driver compares each pixel of the two objects (step 415). If any pixels are different, the objects do not match (step 404). If the pixels of the objects are the same, the printer driver compares each bit of the required elements of the received graphical object to a corresponding bit of the required elements of the stored graphical object (step 420). If the bits are the same, the printer driver recognizes that the objects match (step 425). If any of the bits are different, the printer driver recognizes that the objects do not match (step 404).

In an alternative implementation, the comparison of raster objects can include a subset of the sequence of the steps shown in FIG. 4, possibly in a different order. For example, in one alternative implementation, the printer driver first compares the data size elements of the objects. If the data sizes are the same, the printer driver then compares each bit of the required elements of the objects. In this case, the comparison process does not include steps 410 and 415 shown in FIG. 4. In another alternative implementation, the comparison process for raster objects includes different steps from those shown in FIG. 4, such as a comparison of boundary elements or of the number of pixels in each object.

Figure 5:
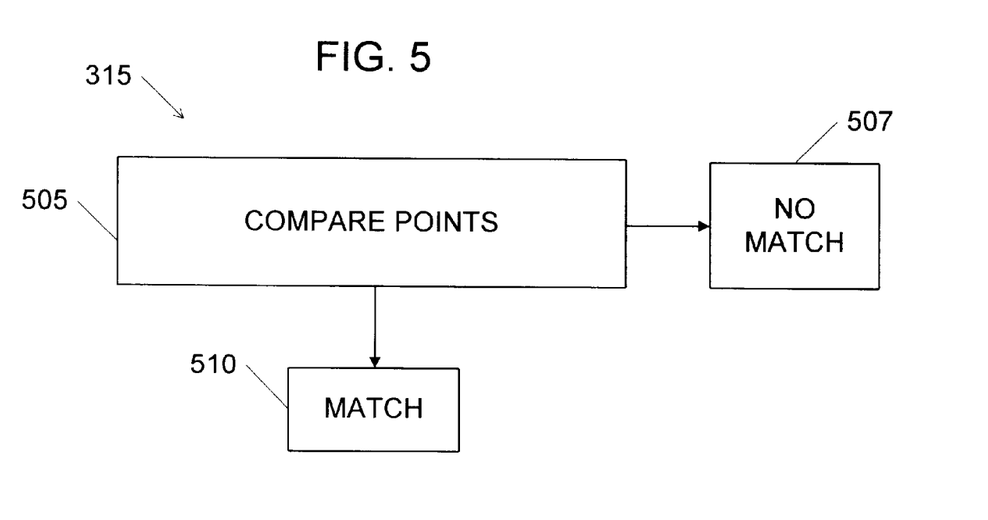

As shown in FIG. 5, in an application of a comparison process 315 for vector objects, the printer driver compares the types of the vector objects (step 502). If the types are not the same, the vector objects do not match (step 504). If the types of the vector objects are the same, the printer driver compares the points defining the vector objects (step 505). If the points are the same, the printer driver recognizes that the objects match (step 510). If the points are not the same, the printer driver recognizes that the objects do not match (step 504).

In an alternative implementation, vector objects include an overriding element which is a transformation element. The transformation element indicates an object is an affine transformation of a shape defined by required elements. Thus, two objects which have the same shape subject to an affine transformation match because the shape is defined by required elements and the transformation element is an overriding element. In a simple example, if the first object is a circle with a radius of 5 and the second object is a circle with a radius of 10, the printer driver recognizes that the objects match, subject to an affine transformation of scale. The transformation element of the second object is passed to the printer as an overriding element.

In an alternative implementation, the printer driver applies a single comparison process generally to all objects. The printer driver is designed to optimize the transmission of only a single type of object, and therefore to apply a single comparison process to all objects. In this case a comparison of type elements is not necessary. In one implementation, the printer driver compares the data size elements of the objects and then compares the bits of the objects. This comparison is also effective for multiple types of objects which have common required elements. In another alternative implementation, the printer driver compares each point of the objects to determine a match. This is effective for a system where all graphical objects are vector objects. In another alternative, the printer driver compares the objects subject to affine transformation, as described above.

As described above, comparison processes in alternative implementations vary in complexity. The comparison process shown in FIG. 4 includes four comparisons, while the comparison process shown in FIG. 5 includes one comparison. The comparison process can be a complex procedure for optimized recognition of matching objects or can be a simple in-line statement in the program code of the printer driver.

Figure 1:
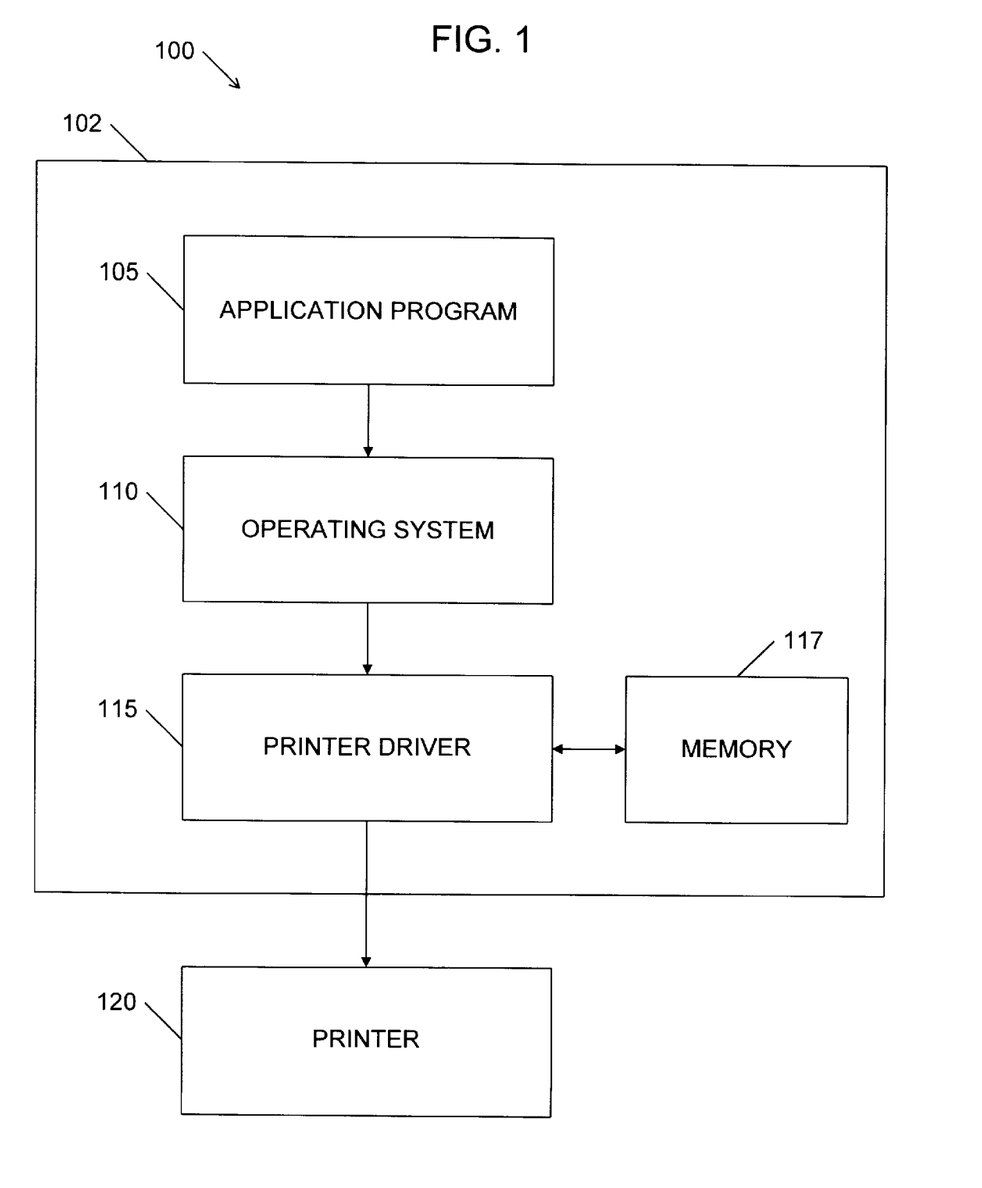
Figure 6:
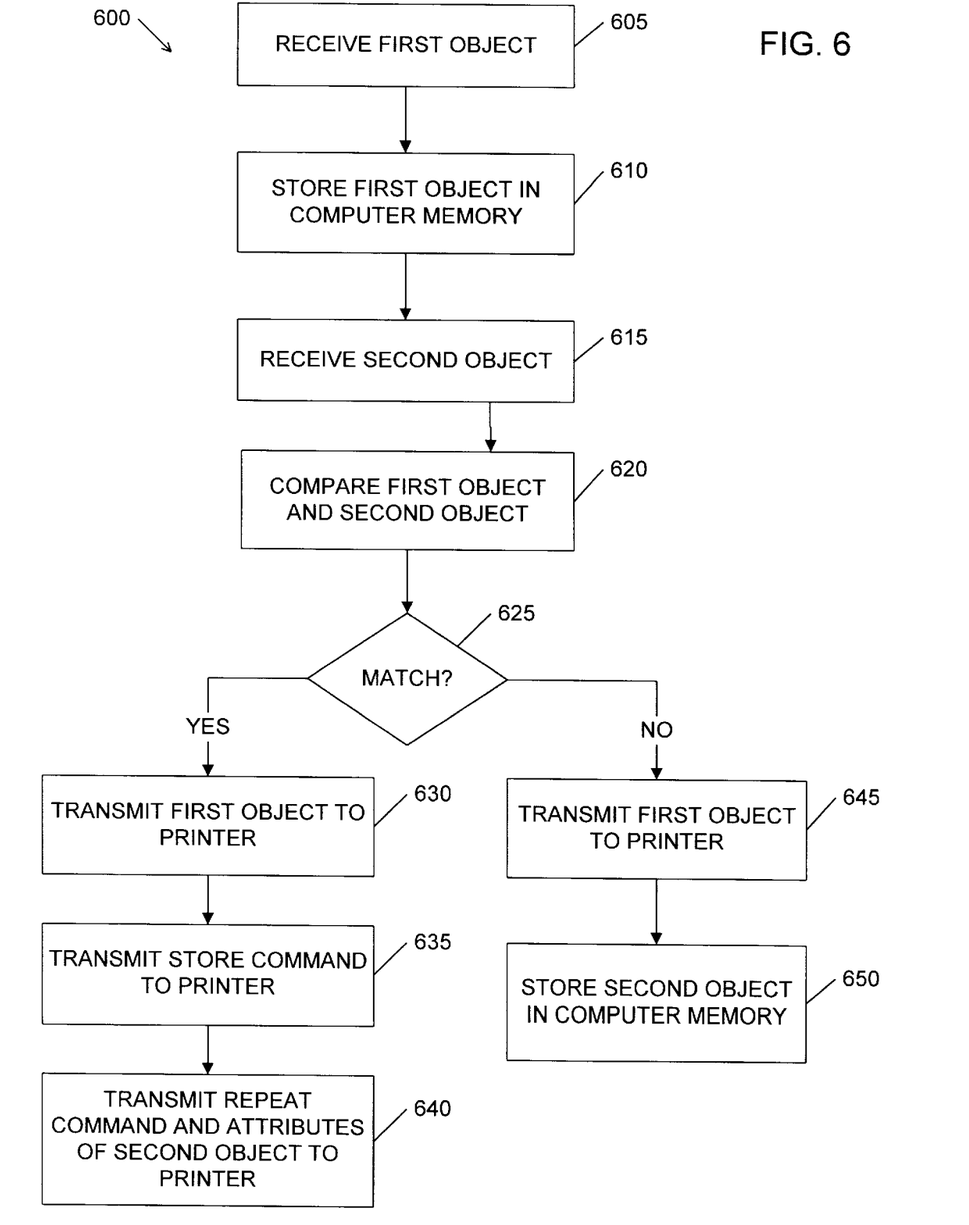

As shown in FIG. 6, an additional alternative implementation employs a linear process 600 for transmitting graphical objects to a printer in a computer system as shown in FIG. 1. The printer driver receives a first object from the application program (step 605). The printer driver stores the first object in the computer memory (step 610). The printer driver defers transmitting the first graphical object to the printer. The printer driver receives a second graphical object (step 615). The printer driver then compares the first graphical object stored in the memory and the second graphical object (step 620). The comparison process applied may be one of the processes described above.

If the first graphical object and the second graphical object match (step 625), the printer transmits the first graphical object to the printer (step 630). The printer driver then transmits a store command to the printer (step 635). The store command causes the printer to store the first object in the memory of the printer. The first object and the store command may be sent together as a single data sequence or in serial. Alternatively, the printer stores objects as they are received and so the printer driver does not send a store command to the printer. The printer driver then transmits a repeat command along with any elements of the second object which differ from those of the first object (step 640). Alternatively, the printer driver transmits all the overriding elements of the second object to the printer. The repeat command causes the printer to print the last object received again. Alternatively, the printer driver assigns an identifier to the first graphical object and transmits that identifier in place of the repeat command, as described above. Any elements accompanying the repeat command override elements of the last object received by the printer. Thus, the printer prints the first object again, according to the transmitted elements. This process 600 may repeat where the repeat command and corresponding elements are transmitted to the printer for each consecutive repetition of the graphical object.

If the first object and the second object do not match (step 625), the printer driver transmits the first object to the printer (step 645). The printer driver stores the second object in the computer memory (step 650). This process 600 may repeat for later objects with the second object taking the place of the first object in the process described above. In the process 600, a single object is stored at any given time in the computer memory and the memory of the printer. Accordingly, a saving in memory and transmission efficiency is achieved for consecutively repeated objects, as opposed to objects which may repeat through the course of a page or larger non-consecutive sequence of objects. In an alternative implementation, the printer driver transmits the first graphical object to the printer before comparing the first and second graphical objects.

In an alternative implementation, the graphical objects compared and transmitted by the printer driver are aggregated clipping paths. The application program sends pieces of a clipping path to the printer driver and the printer driver aggregates the pieces into a single clipping path. In this implementation, aggregated clipping paths are treated in the same way as graphical objects are treated as described above. The printer driver defers transmitting the first aggregated clipping path graphical object at least until all the pieces of the clipping path have been received. The printer driver defers transmitting the first aggregated clipping path until after comparing the first and second aggregated clipping paths. Alternatively, as described above, the printer driver does not defer transmitting the first aggregated clipping path.

Figure 7:
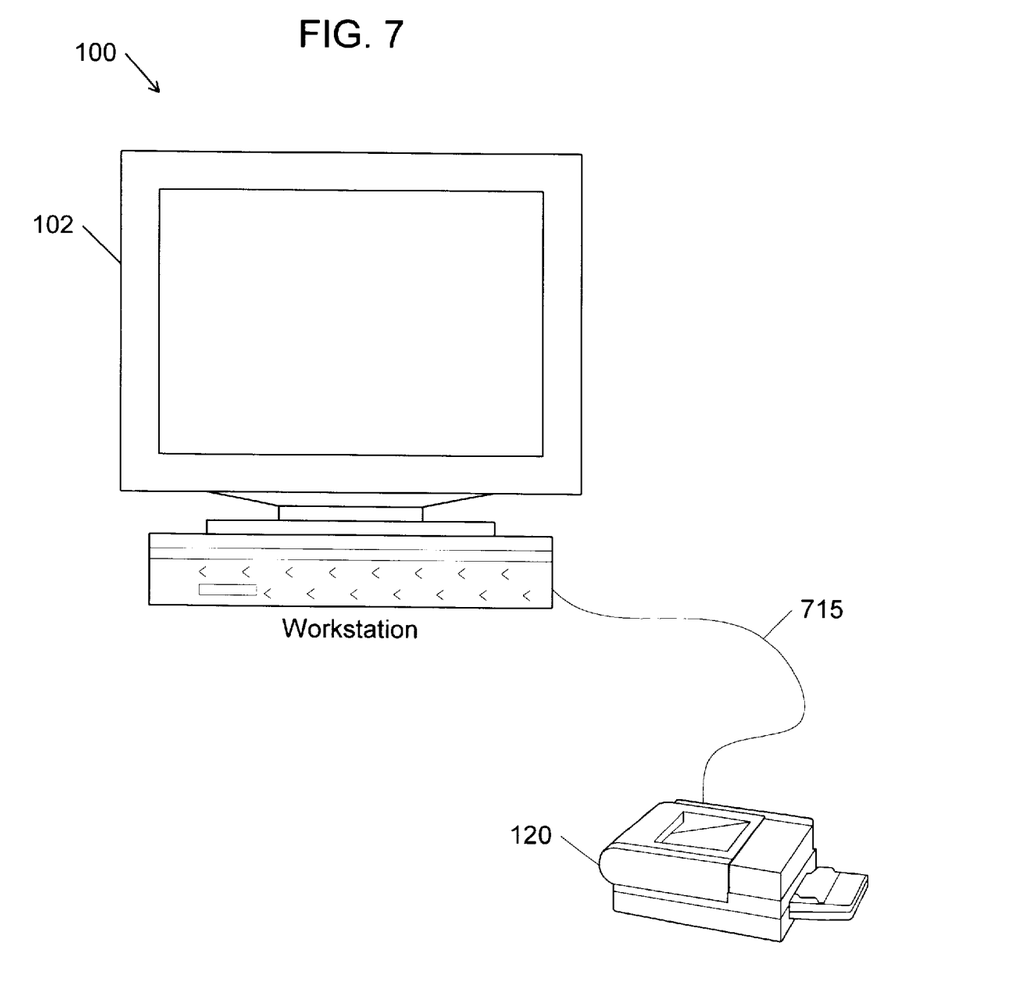

FIG. 7 shows an implementation of the computer system 100. The computer 102 may be a work station including a monitor, processing element, storage element, and user input element. The computer 102 may be connected to the printer 120 by a cable 715. The printer 120 may be any of a variety of conventional printers, so long as the printer 120 has a printer memory capable of storing at least one graphical object. Alternatively, the printer memory can be connected to the printer 120, but physically outside the printer 120. The data link between the computer 102 and the printer 120 may be unidirectional or bidirectional.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Other implementations are within the scope of the following claims. For example, the printer may be connected to the computer system directly through a cable as shown in FIG. 7 or across a network. The technique also can be implemented in a printer driver internal to or specifically associated with an application program. In addition, the technique can be implemented in a display driver for a display adapter instead of a printer driver for a printer.

What is claimed is:

1. In a computer system, a method of transmitting graphical objects from the computer system to a printer, comprising:

receiving a first graphical object from an application program;

storing the first graphical object in a computer memory coupled to the computer system, where the computer memory is not shared with the printer;

receiving a second graphical object from the application program;

comparing the second graphical object to the first graphical object;

transmitting the first graphical object to the printer; and transmitting to the printer an identifier identifying the first graphical object to the printer if the second graphical object matches the first graphical object, and otherwise storing the second graphical object in the computer memory and transmitting the second graphical object to the printer; and wherein each graphical object includes one or more elements; the second graphical object matches the first graphical object; and the identifier sent to the printer includes one or more elements of the second graphical object which override corresponding elements of the first graphical object.

2. The method of claim 1, where the computer memory is a disk storage device coupled to the computer system through a local area network.

3. The method of claim 1, where the first graphical object is deleted from the computer memory when the second graphical object is stored.

4. The method of claim 1, further comprising:

where the second graphical object does not match the first graphical object, storing the second graphical object in the computer memory in addition to the first graphical object;

receiving a third graphical object from the application program; and transmitting the third graphical object to the printer and storing the third graphical object in the computer memory if the third graphical object does not match any of the graphical objects stored in the computer memory, and otherwise transmitting an identifier identifying the matching graphical object to the printer if the third graphical object does match one of the graphical objects stored in the computer memory.

5. The method of claim 4, where the steps of claim 4 are repeated for each graphical object in a page.

6. The method of claim 1, where a graphical object includes one or more bits, and further comprising:

comparing each bit of the first graphical object to a corresponding bit of the second graphical object to determine if the first graphical object matches the second graphical object.

7. The method of claim 1, where a graphical object includes one or more points defining a shape of the graphical object, and further comprising:

comparing each point of the first graphical object to a corresponding point of the second graphical object to determine if the first graphical object matches the second graphical object.

8. The method of claim 1, where:

two graphical objects match if the two graphical objects are identical subject to an affine transformation.

9. The method of claim 1, further comprising:

predicting in the computer system how a printer memory will be used; and deleting a graphical object from the computer memory when the prediction indicates the printer will delete a corresponding graphical object from the printer memory.

10. The method of claim 1, where the graphical objects are deleted from the computer memory when the end of a page is transmitted to the printer.

11. The method of claim 1, where the identifier is generated by the computer system.

12. The method of claim 1, where the identifier is generated by the printer.

13. The method of claim 1, further comprising transmitting a repeat command to the printer where the second graphical object matches the first graphical object.

14. The method of claim 1, where the overriding elements include a location element.

15. The method of claim 1, where the overriding elements include a color element.

16. The method of claim 1, where the overriding elements include a scale element.

17. The method of claim 1, where the overriding elements include a transformation element.

18. The method of claim 1, where the overriding elements include a clipping path element.

19. The method of claim 1, where each graphical object is received from the application program through an operating system and the operating system assigns an identifier to each graphical object.

20. The method of claim 1, where a graphical object defines a clipping path.

21. The method of claim 1, where a graphical object defines an aggregated clipping path.

22. The method of claim 1, where the steps of claim 1 are performed by a printer driver which is external to and independent of the application program.

23. The method of claim 1, where the steps of claim 1 are performed by a dependent print driver which is external to and dependent upon the application program.

24. The method of claim 1, where the steps of claim 1 are performed by an internal print driver which is internal to and dependent upon the application program.

25. Apparatus for transmitting graphical objects defined according to a type of object from a computer system to a printer, comprising a computer-readable storage medium tangibly embodying program instructions operable for causing a programmable processor to:

receive a first graphical object from an application program;

store the first graphical object in a computer memory coupled to the computer system, where the computer memory is not shared with the printer;

receive a second graphical object from the application program;

compare the second graphical object to the first graphical object;

transmit the first graphical object to the printer;

transmit to the printer an identifier identifying the first graphical object transmitted to the printer if the second graphical object matches the first graphical object, and otherwise store the second graphical object in the computer memory and transmit the second graphical object to the printer;

recognize a type of the second graphical object;

select one of a plurality of comparison processes for comparing the second graphical object to the first graphical object according to the type of the second graphical object; and apply the selected comparison process to compare the first graphical object and the second graphical object if the first graphical object and the second graphical object are of the same type.

26. The apparatus of claim 25, where the program instructions are within a printer driver.

27. The apparatus of claim 25, further including program instructions operable to cause the computer system to:

where the second graphical object does not match the first graphical object,
store the second graphical object in the computer memory in addition to the first graphical object;
receive a third graphical object from the application program; and
transmit the third graphical object to the printer and store the third graphical object in the computer memory if the third graphical object does not match any of the graphical objects stored in the computer memory, and otherwise transmit an identifier identifying the matching graphical object to the printer if the third graphical object does match one of the graphical objects stored in the computer memory.

28. The apparatus of claim 27, where the steps of claim 27 are repeated for each graphical object in a page.

29. The apparatus of claim 25, further including program instructions operable to cause the computer system to:

predict in the computer system how a printer memory will be used; and delete a graphical object from the computer memory when the prediction indicates the printer will delete a corresponding graphical object from the printer memory.

30. The apparatus of claim 25, where the graphical objects are deleted from the computer memory when the end of a page is transmitted to the printer.

31. In a computer system, a method of transmitting graphical objects from the computer system to a printer, comprising:

receiving a first graphical object from an application program;

storing the first graphical object in a computer memory coupled to the computer system, where the computer memory is not shared with the printer;

receiving a second graphical object from the application program;

comparing the second graphical object to the first graphical object;

transmitting the first graphical object to the printer;

transmitting to the printer an identifier identifying the first graphical object to the printer if the second graphical object matches the first graphical object, and otherwise storing the second graphical object in the computer memory and transmitting the second graphical object to the printer;

recognizing a type of the second graphical object;

selecting one of a plurality of comparison processes for comparing the second graphical object to the first graphical object according to the type of the second graphical object; and applying the selected comparison process to compare the first graphical object and the second graphical object if the first graphical object and the second graphical object are of the same type.

32. The method of claim 31, where a graphical object includes a data size and at least one bit, and where one of the plurality of comparison processes comprises:

comparing a data size of the first graphical object with a data size of the second graphical object; and comparing each bit of the first graphical object with a corresponding bit of the second graphical object.

33. The method of claim 31, where a graphical object includes a data size, a color depth, at least one pixel, and at least one bit, and where one of the plurality of comparison processes comprises:

comparing a data size of the first graphical object with a data size of the second graphical object;

comparing a color depth of the first graphical object with a color depth of the second graphical object;

comparing each pixel of the first graphical object with a corresponding pixel of the second graphical object; and comparing each bit of the first graphical object with a corresponding bit of the second graphical object.

34. The method of claim 31, where one of the plurality of comparison processes comprises:

comparing a vector definition of the first graphical object and a vector definition of the second graphical object.

35. The method of claim 31, where:

a graphical object includes one or more points defining a shape of the graphical object; and one comparison process comprises comparing each point of the first graphical object with a corresponding point of the second graphical object.

* * * * *